Nov. 3, 1959     F. SKAY     2,911,568
LIGHT RESPONSIVE SYSTEM AND PHOTOCONDUCTIVE CELL THEREFOR
Filed March 26, 1956     2 Sheets-Sheet 1
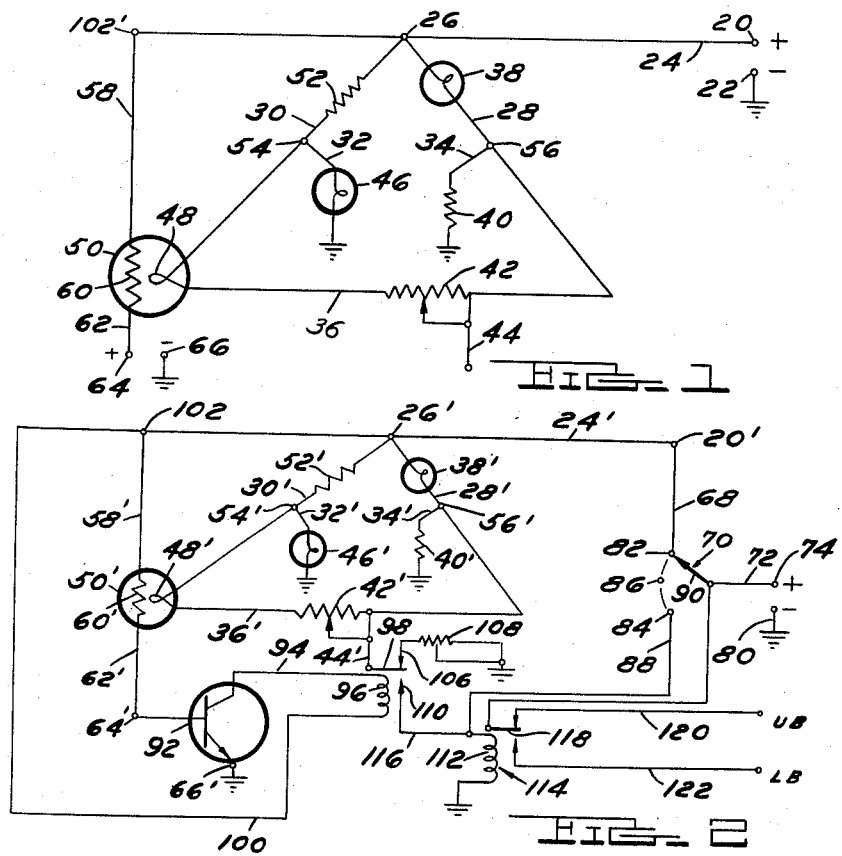
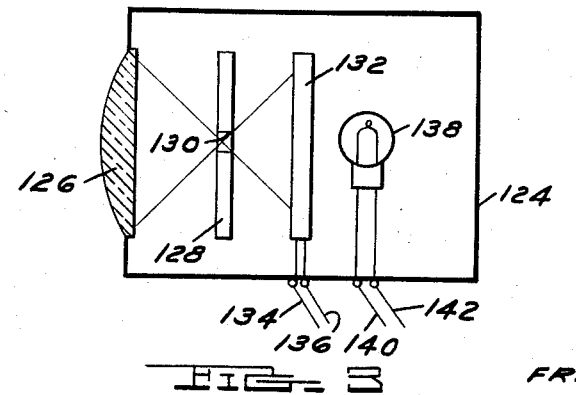
INVENTOR.
FRANK SKAY
BY
Burton & Parker
ATTORNEYS Nov. 3, 1959        F. SKAY        2,911,568
LIGHT RESPONSIVE SYSTEM AND PHOTOCONDUCTIVE CELL THEREFOR
Filed March 26, 1956        2 Sheets-Sheet 2
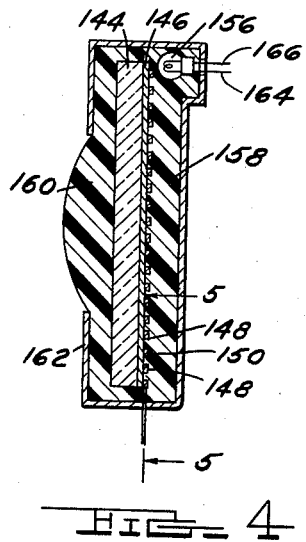
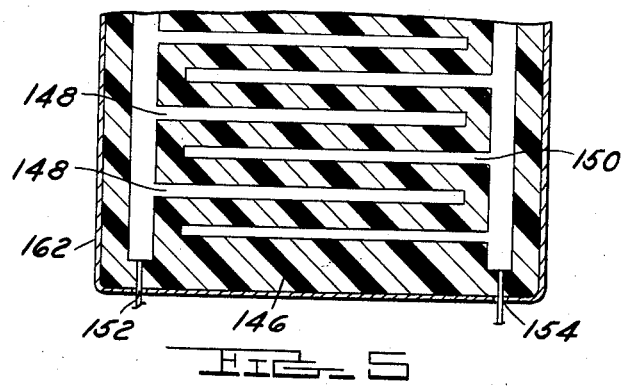
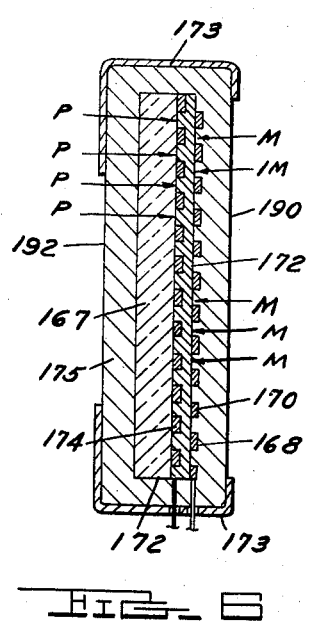
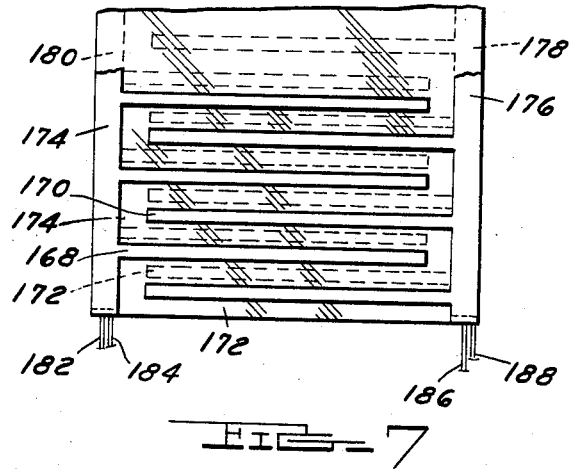
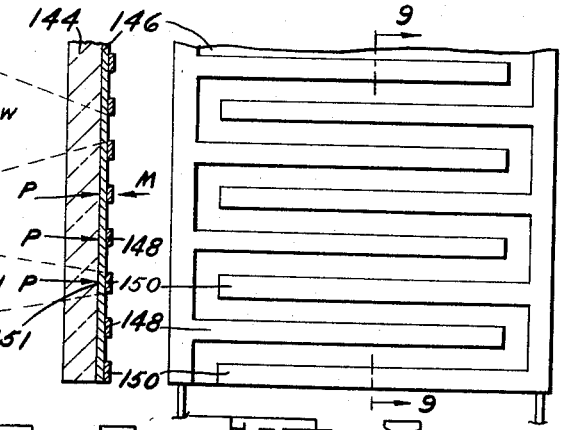
INVENTOR.
FRANK SKAY
BY
Burton & Parker
ATTORNEYS

United States Patent Office 2,911,568
Patented Nov. 3, 1959

2,911,568

LIGHT RESPONSIVE SYSTEM AND PHOTO-CONDUCTIVE CELL THEREFOR

Frank Skay, Detroit, Mich., assignor to Photo-Matic Inc., Detroit, Mich., a corporation of Michigan Application March 26, 1956, Serial No. 573,955

4 Claims. (Cl. 315—83)

This invention relates to photoconductive cells and control circuits including such cells.

A photoconductive cell may be considered similar to an electric switch which regulates the electrical flow in a circuit in response to various levels of light intensity falling on the cell. The cell is provided with a photoconductive material such as cadmium sulphide. It is the property of cadmium sulphide that its electrical resistivity changes with the level of light intensity falling thereupon. Other substances may also have a resistivity which varies with the level of light intensity falling upon them such as selenium, and therefore, while I have disclosed and discuss only a cadmium sulphide cell, it is to be understood that any other photoconductive material operating in like manner as cadmium sulphide, is within the purview of this invention. When no light falls upon this photoconductor, its resistance to current flow is high. However, when exposed to light, its resistance decreases. The resistance of the cell in a total absence of light is termed its dark resistance. All other resistances are determined in relation to the light intensity falling on the cell.

It is characteristic of cadmium sulphide cells that while their electrical resistance will fall rapidly as the light intensity upon them increases, the resistance will increase slowly as the light intensity decreases. With any given cell the length of time required to return to its dark resistance will be found to depend on the amount of light to which the cell was previously subjected, or, in other words, the amount by which its resistivity was lowered. It is also an inherent characteristic of photoconductive substances such as cadmium sulphide that the time lag in returning to a higher resistance depends in part upon the resistance levels, or light intensity levels, in which the substance is working. In other words, the time lag to increase the resistance a determined amount is less when working in a lower range of resistances than when working in a higher range of resistances. Many devices whose operation is to be made dependent upon a fluctuating light must respond rapidly to a decrease in light intensity as well as an increase thereof. As a result, photoconductive cells using cadmium sulphide or the like whose increase in resistance is slow, have not heretofore been satisfactory for applications requiring a rapid response to decreasing light levels.

Therefore an object of my invention is the provision of an improved control circuit which includes a cadmium sulphide or the like type photoconductive cell, and which circuit is substantially more sensitive to both increasing and decreasing levels of light intensity falling on the cell than prior art circuits employing a cadmium sulphide or the like type cell. A concomitant object is the provision of an improved photoconductive cell whose time lag in returning to a higher electrical resistance following a decrease in the light intensity falling on the cell is substantially less than the prior art cells.

At least one cadmium sulphide type photoconductive cell commercially available at present includes a pair of interleaved comb type grids of gold or silver on a layer of cadmium sulphide. The grids are provided with electric terminals so that the same may be connected in an electric circuit. When light strikes the cadmium sulphide layer, its electrical resistance is reduced as above mentioned and current may flow from one grid to the other. Because of the difficulty in accurately controlling the quality of these cells during their manufacture, the dark resistance from one cell to the next may vary anywhere from 100 to 10,000 megohms and the amount of light required to reduce this resistance to a determined value will, consequently, also vary.

Therefore another object of the invention is the provision of improved photoconductive type cells wherein the varying dark resistances from cell to cell are compensated for in a novel fashion so that a given amount of light striking each cell will reduce the cell's resistance to a determined value.

I have discovered that if a second source of light is associated with the photoconductor of the cell to initially set the photo-resistivity of the conductor at a lower level, thereafter the fluctuating primary light to which the cell is intended to respond will vary the resistivity of the cell within a lower range of resistance values, and that as a result the time lag to return to a high resistance, when the light intensity of the primary light is reduced, may be materially shortened, as well as the amount by which the primary light intensity level must decrease to raise the resistance to a determined value. As is hereinafter disclosed, the photoconductor is exposed to a secondary source of light, or what may be termed a modulating light, and the intensity of this light is initially set to lower the effective resistance of the photoconductor to a determined value. Thereafter, when the photoconductor is exposed to the primary light, the intensity levels of which the photoconductor is to respond to in effecting a control function, the resistance of the photoconductor never increases beyond a limit determined by the light intensity of the secondary light and the resistance values must fluctuate within resistance limits below that determined by the secondary light. As pointed out above, the responsiveness or sensitivity of the photoconductor is improved when it operates in a lower range of resistance values, and therefore the secondary light makes possible the increased sensitivity of the photoconductor.

In one embodiment of my invention, the secondary or modulating light is located exteriorly of the photoconductive cell, while in another embodiment the modulating light is disposed interiorly of the cell to provide a unitary structure.

Another object of the invention is the provision of a novel grid arrangement of the gold or silver on the cadmium sulphide to effect a more sensitive reaction to fluctuation of the primary light.

Another object of the invention is the provision of a light-sensitive circuit, including a photoconductive cell, and which circuit is well adapted to serve as a control for a wide variety of electrically operated devices whose operation is to be made dependent upon fluctuating levels of light intensity, and wherein a rapid and accurate response to both increasing and decreasing levels of light intensity is desired. One application, as hereinafter described, is the automatic control of automotive headlights. However, it will become apparent that my invention has wide application and is not limited to this specific adaptation.

Another object of my invention is the provision of a light-sensitive control circuit which is of simple construction utilizing a minimum of parts in the most optimum fashion, and which may be constructed at a lower cost than any other light-sensitive control commercially available at present.

Still another object of my invention is the provision of a novel light-sensitive control circuit in which my improved photoconductive cell is connected, and which circuit will respond to a determined increase in the primary light falling on the cell to effect one control function and will respond to a determined decrease in the primary light falling on the cell to effect another control function, with the two control functions occurring at different resistance values of the cell. This object is of particular importance when the invention is used to automatically control the high and low beam dimming features of automotive headlights, as it prevents the return of the headlights to high beam when the oncoming vehicle dims its lights.

Still another and important object of the invention is the provision of a light-responsive system including my improved photoconductive cell with its modulating source of light, and which system and modulating source of light will maintain substantially constant the output of the cell for any given value of the primary or control light intensity falling on the cell, despite the fact that the source of electric power for the system and cell fluctuates between different voltage values.

Other objects, advantages, and meritorious features will more fully appear from the specification, claims, and accompanying drawing, wherein:

Fig. 1 is a schematic illustration of the basic photo-sensitive control circuit and includes the improved photoconductive cell;

Fig. 2 shows the basic circuit of Fig. 1 adapted to control the high and low beam filaments of automotive headlights;

Fig. 3 is a schematic representation of a light-responsive unit including the improved photoconductive cell, an optical system and a modulating source of light for the cell, such as may be used in an automatic headlight dimmer for automotive vehicles;

Fig. 4 is a cross sectional view through one embodiment of the improved photoconductive cell;

Fig. 5 is a cross sectional view taken on the line 5—5 of Fig. 4;

Fig. 6 is a cross sectional view through another embodiment of the photoconductive cell;

Fig. 7 is a view of the grids and cadmium sulphide layer in the Fig. 6 embodiment of the cell;

Fig. 8 is a fragmentary magnified view of the grids and cadmium sulphide layer of the Fig. 4 cell; and Fig. 9 is a cross sectional view taken on the line 9—9 of Fig. 8.

The basic photoconductive cell circuit with the photoconductive cell therein is shown in Fig. 1. A source of electric potential is connected across terminals 20 and 22 such as a 12-volt battery or the like. With the circuit having components of the values illustratively given, this voltage may vary anywhere from 11 to 17 volts without appreciably disturbing the accuracy of the operation of the circuit. Terminal 22 is grounded as shown. Terminal 20 is connected by conductor 24 to terminal 26 of an unbalanced bridge circuit. The bridge circuit includes the arms 28 and 30 and the grounded arms 32 and 34. Connected between arms 28 and 30 is the cross arm 36. Connected in arm 28 is a variable thermal resistor 38 which may be, for example, a No. 55 automotive type lamp rated at 44 amperes at 6 volts. Connected in arm 34 is a resistance 40 which may be of a 100-ohm value. A rheostat 42 of 50 ohms is connected in cross arm 36. Also connected to cross arm 36 is a conductor 44 which may be connected to a load as described in conjunction with Fig. 2. Connected to arm 32 is a variable thermal resistor 46 which may be, for example, a No. 1816 lamp rated at .33 ampere at 13 volts. The filaments of lamps 38 and 46 may, if desired, be placed in one envelope whereby the heat of one filament affects the resistance of the other filament and vice versa. Connected in cross arm 36 in series with rheostat 42 is the modulating lamp 48 for my improved photo conductive cell 50. This lamp may be a No. 53 automotive type miniature lamp rated at 12 volts and is adapted to illuminate the photoconductor 60. As shown in Fig. 1 the modulating lamp is a part of the cell; however, as will be pointed out in connection with Fig. 3, the lamp may be separate from the cell. The rheostat 42 is used to initially set the illumination of lamp 48. Connected in arm 30 of the bridge is a fixed resistance 52 which may be, for example, of 25 ohms and rated at 5 watts. Arm 30 connects with arms 32 and 36 at junction 54, while arm 28 connects with arms 34 and 36 at junction 56.

Conductor 58 is connected to junction 26 at one end and to the photoconductive element 60 of cell 50 at the other end. Element 60 is connected by lead 62 to a terminal 64. A grounded terminal 66 is associated with terminal 64 and between these terminals a device to be controlled may be connected as hereinafter described in conjunction with Fig. 2.

The basic photoconductor cell circuit operates as follows. Assume that the device whose operation is to be controlled is connected between terminals 64 and 66 and is responsive to a determined difference in potential, or current flow, between points 64 and 66 to effect one function, and is responsive to a lower difference in potential, or current flow, between points 64 and 66 to effect another function. For example, if a relay switch is connected between terminals 64 and 66, upon one potential difference existing across terminals 64 and 66, the relay is closed, while with a lower potential difference the relay is opened. Now, if 12 volts with respect to ground is impressed upon terminal 20, current will flow through arms 28, 30, 32, and 34 of the bridge to ground. If there is an absence of light upon element 60, its electrical resistance will be so high that current flow through it is negligible. With the lamps and fixed resistances of the values above indicated in arms 28, 30, 32, and 34, junction 56 is at a higher potential with respect to ground than is junction 54, and therefore while current will flow from junction 56 through arm 34, current will also flow from junction 56 through arm 36, through lamp 48, and to ground through arm 32. The amount of current flowing through arm 36 may be controlled by rheostat 42. It is apparent that I have provided an unbalanced bridge circuit with modulating lamp 48 connected in series with a rheostat in the cross arm of the bridge extending between opposite sides thereof at different potentials with respect to ground. With the provision of the variable thermal resistors of the values given, whose resistances increase with increased voltage, the difference in potential between points 54 and 56 will decrease as the voltage at terminal 20 increases with respect to ground. As a consequence, if the voltage at terminal 20 fluctuates, the intensity of illumination of modulating lamp 48 will fluctuate inversely to thereby effect a control on the current flow through photoconductor 60 and terminal 64. Therefore, with lamps and resistances of values mentioned above, the voltage at 20 may vary anywhere from 11 to 17 volts without appreciably affecting the current flow at terminal 64. This is of substantial importance where only a few microamperes difference in current flow at terminal 64 will effect a cycling of the device connected between terminals 64 and 66.

Assume now that rheostat 14 is adjusted so that the illumination of the modulating lamp 48 reduces the resistance of element 60 and increases the current flow through element 60 to a determined value. This value will remain, as above mentioned, substantially constant even though there is a fluctuation in voltage at terminal 20. Now when the primary light to which the device is to respond strikes element 60, the resistance thereof will be further reduced, and will be reduced an amount directly related to the intensity of the primary light. If the light intensity is great enough, sufficient current will flow through element 60 to effect a responsive functioning or cycling of the device connected between terminals 64 and 66. On the other hand, when the primary light intensity upon element 60 is reduced, the resistance of element 60 increases. Because the resistance of element 60 was initially decreased by modulating lamp 48, and because the time lag of element 60 is less when working in a lower resistance range, its response to the decreasing primary light intensity is rapid. Such resistance may increase sufficiently to reduce current flow through conductor 58 to a point where the device connected between terminals 64 and 66 will respond in reverse function to that previously mentioned.

The basic photoconductive cell circuit above described is particularly well suited for use in an automatic automotive headlight dimming device. From the hereinafter-described circuit for a headlight dimmer, the adaptation of the basic photoconductive circuit for other uses will be aparent to those skilled in the art. Fig. 2 shows schematically the arrangement of an automatic headlight dimmer. Terminal $20^1$ corresponds to terminal 20 of Fig. 1 except that instead of being connected directly to a battery or other source of E.M.F., it is connected by lead 68 to a 3-position switch 70, such as a foot switch installed in the toe board of the automotive vehicle. By lead 72 the switch is connected to the positive terminal 74 of the vehicle's battery-generator system. The negative terminal 78 of such system is grounded as at 80. The 3-position switch 70 has two active contacts 82 and 84 and one dead contact 86. Contact 82 is connected to lead 68, and contact 84 is connected to lead 88. 90 is the shiftable contact for selectively connecting lead 72 to either of the three contacts 82, 84, or 86. Components in the Fig. 2 circuit corresponding to components in the Fig. 1 basic photoconductive cell circuit are indicated by primed reference numerals and a repetitious description of them is unnecessary.

Connected between terminals $64^1$ and $66^1$ is a transistor 92 which may be an NPN (sylv. 2N–35) designed to cycle on 20 microamperes of current to its base connection. By lead 94 the transistor is connected to the coil 96 of a sensitive type master relay switch having a coil 96 of 10,000 ohms, and with single-pole, double-throw contacts normally spring-biased to pull down on less than one milliampere of current through the coil. The throw is schematically indicated at 98. The coil 96 is connected by lead 100 to terminal 102 in lead 58. The throw 98 of the relay is connected to cross arm $36^1$ of the unbalanced bridge circuit by lead $44^1$ and is biased against contact 106 of grounded rheostat 108. By means of the rheostats $42^1$ and 108, the intensity of illumination of the modulating lamp $48^1$ may be predetermined both when the coil 96 is energized and when it is de-energized.

The throw 98 of the master relay is attracted by coil 96, when energized, to abut contact 110 connected by lead 116 to the grounded coil 112 of a medium-duty slave relay switch 114. The slave relay 114 has a 60-ohm coil, and may be of a single-pole, double-throw contact variety, with the throw 118 normally spring-biased against a contact connected to lead 120 for the upper beam filaments of the vehicle headlights. The throw 118 pulls down to abut contacts connected to the lower beam filament lead 122 upon a .15–.2 ampere current through the coil 112. Lead 88 from foot switch 70 is connected into lead 116 as shown.

In the operation of the circuit of Fig. 2, and assuming the foot switch throw 90 is in the position shown, and there is no primary light striking the element $60^1$ such as illumination from the headlights of an oncoming vehicle. the modulating lamp is burning and the throws 98 and 118 of the two relays are in the positions shown such that the high or upper beam filaments of the vehicle's headlights are energized. Now, as an oncoming vehicle approaches, and the light from its headlights strikes the element $60^1$, the resistance of the element is lowered and the current flow through leads $58^1$ and $62^1$ increases. When the light intensity striking the element has increased sufficiently so that the current flow to the base connection of transistor 92 reaches 20 microamperes, then the transistor cycles and current from terminal 102 flows through lead 100, through relay coil 96, lead 94 and to ground at $66^1$. This effects movement of throw 98 against contact 110 to cause energization of coil 112 of slave relay 114. Upon energization of coil 112, throw 118 is shifted to de-energize the high beam filaments of the vehicle's headlights and energize the low beam filaments through lead 122.

With the attraction of throw 118 toward coil 112, the resistance from lead $44^1$ to ground is less than through rheostat 108, and modulating lamp $48^1$ will burn somewhat more dimly than before. This dimming of the modulating lamp, the light intensity of which may be initially determined by an adjustment of rheostat $42^1$, serves to increase slightly the resistance of element $60^1$. However, because the amount of current flowing through coil 96 that will hold throw 98 against contact 110 is less than the amount of current necessary to attract throw 98 to the coil initially, the throw 98 will not be released by this dimming of lamp $48^1$ and the consequent increased resistance of element $60^1$.

If, at this time, the oncoming vehicle also dims its headlights, the total light striking the element $60^1$ will again be reduced thereby again increasing the resistance of element $60^1$. However, by initially adjusting rheostat $42^1$, the total light energy striking element $60^1$, even after the oncoming vehicle has dimmed its lights, may be kept just above that at which the resistance of element $60^1$ would cause such a reduction in current flow to coil 96 that throw 98 would spring back to return the headlights to high beam. As the oncoming vehicle passes, and illumination from its headlights no longer strikes element $60^1$, the resistance of element $60^1$ increases sufficiently to so reduce the current flow through it as to effect a release of throw 98 so that the throw returns to abutment with contact 106 and the headlights are returned to high beam by the slave relay.

It should be noted that the dimming of modulating lamp $48^1$, when the headlights are turned to low beam, increases the resistance of element $60^1$ toward that resistance sufficient to cause the release of throw 98 by coil 96 of the master relay. However, the resistance is not increased sufficiently to cause a return to high beam even though the oncoming vehicle dims its headlights. However, when the oncoming vehicle does dim its lights, the resistance of element $60^1$ is very nearly that sufficient to effect a release of throw 98 by the master relay. Consequently, when the oncoming vehicle passes, the resistance of element $60^1$ is already almost sufficient to re-cycle the relay circuits, and with the further increase the relay circuits, and with the further increase in resistance as the oncoming veihcle passes, the relays are promptly re-cycled.

It should also be noted that the return from low to high beam is accomplished with the modulating lamp $48^1$ energized. As a result, the resistance of element $60^1$ has been lowered and the element is operating in a resistance range where its time lag in returning to a higher resistance is less than would be the case without the use of the modulating lamp. In addition, by suitably adjusting the intensity of illumination of the modulating lamp $48^1$, the amount of light from an oncoming vehicle or street lamp, etc., necessary to cycle the relays to automatically turn the headlights on low beam, may be accurately preset.

By virtue of the bridge circuit particularly described in connection with Fig. 1, the automotive vehicle's generator will not disturb the operation of the device. The potential difference between junctions 54¹ and 56¹ varies inversely as the fluctuation in voltage at terminal 20¹ with respect to ground as above mentioned. Consequently, as the automotive vehicle's generator speeds up, the intensity of illumination of the modulating lamp 48¹ will decrease, and vice versa. In this way the output from element 60¹ of the photoconductive cell is maintained substantially constant regardless of voltage fluctuations at terminal 74¹.

To manually selectively operate the high and low beam head lamp filaments, the throw of foot switch 70 is moved to abut contact 86, whereupon the automatic dimmer is disconnected from the relay 114 and the vehicle's headlights are placed on high beam. By moving the throw to abut contact 84, relay 114 is energized to pull throw 118 down and into abutment with the contact at the end of lead 112 thereby energizing the low beam filaments of the head lamps. By returning the throw of the foot switch to abutment with contact 82, the headlights are placed under the automatic control of the dimming device.

In Fig. 3 is a schematic representation of a light-sensing unit for a light-sensitive control device, such as an automatic headlight dimmer, showing the photoconductive cell mounted in a housing with an associated optical system and modulating lamp. The housing is indicated at 124 and is provided at one end with an optical system comprising a lens 126 and a screen 128. The shape of the housing 124 is optional. The optical system shown is merely illustrative and it will be apparent to those skilled in the art that other optical systems may be employed as well as the one shown without departing from the spirit of the invention. The screen 128 is provided with an aperture therethrough at 130. The screen is disposed at the focal point of lens 126 and prevents stray light from reaching the cell 132. The cell is provided with electric leads 134 and 136 extending out of the housing. The modulating lamp shown at 138 is provided with electric leads 140 and 142 extending out of the housing. The lens, screen, cell, and modulating lamp may be supported in the housing in any convenient fashion. The lamp 138 is disposed to illuminate that surface of the cell opposite that illuminated by light passing through the optical system from outside the housing. The housing may be mounted in any convenient place on the automotive vehicle to intercept light from the head lamps of oncoming vehicles.

Shown in Figs. 4-9 are detailed views of two embodiments of my improved photoconductive cell. In Figs. 4 and 5 one embodiment of the cell is shown, while in Figs. 6 and 7 another embodiment is shown. In the Figs. 4 and 5 cell, the cell comprises a transparent plate, such as a glass plate 144, on one surface of which is deposited a thin translucent layer 146 of cadmium sulphide or other similar photoconductive material. Deposited on one surface of the photoconductive layer are a pair of comb type grids having interlocking or interleaved combs or fingers 148 and 150 of gold or silver or some other suitable conductive material. These combs or fingers are opaque such that light will not pass through them. The fingers or combs extend laterally from side rails running along opposite edges of the cell as shown particularly in Fig. 5. Rail 148¹ is integral with combs 148, while rail 150¹ is integral with combs 150. The lower ends of the rails are provided with terminals or leads 152 and 154. The glass plate 144, cadmium sulphide layer, interlocked grids, along with a modulating lamp 156, are potted in a dielectric transparent plastic housing or enclosure 158 to hermetically seal and position the components of the cell relative to each other. The cell may, if desired, be provided with a lens portion 160. However, the lens is optional and in lieu thereof the front of the cell may be flat as is the cell 132 in Fig. 3. An opaque covering 162 is secured to the outside of the plastic enclosure covering the same except for the lens or front of the cell 160 through which light is admitted to the cadmium sulphide layer. It will be noted that the transparent wall portion of the cell through which light may enter from outside of the cell faces one surface of the cadmium sulphide layer, while light from the modulating lamp 156 filters down through the transparent plastic to impinge upon the opposite surface of the photoconductive layer. The modulating lamp may be provided with leads 164 and 166 which extend out of the dielectric housing.

In Figs. 8 and 9 only the glass plate, photo-conductive layer, and grids of the Figs. 4 and 5 cell are shown, the illustration being in magnified view. Figs. 8 and 9 explain the effect of the modulating and primary light signals upon the cell. The modulating light may be assumed to enter, for purposes of explanation, in the general direction of arrow M in Fig. 9. The interleaved fingers 148 and 150 of the grids are opaque and therefore light can react only on the area of the photoconductive layer between the interleaved fingers, and a shadowed area 151 beneath each comb is left relatively unaffected by the modulating light. In other words there are spaced apart areas of the photoconductive layer of low resistance with areas of higher resistance interposed therebetween. However, when the primary light enters the cell in the general direction of arrow P in Fig. 9, the shadowed high resistance areas 151 beneath each finger are exposed to light which reduces the resistance of such areas and adds to the total conductivity of the cell. In addition, of course, the photons of the primary light striking the layer between the interleaved fingers will additionally reduce the resistance of the layer between the fingers. However, the greatest effect occurs on the shadowed areas 151. The modulating light intensity may be adjusted, as heretofore described, such that the conductivity of the cell is just below that which will pass sufficient current to actuate the switching means connected to the terminals of the grids. Then only a small additional amount of primary light is necessary to further increase the conductivity of the cell sufficiently to actuate the switching means connected to the terminals.

The embodiment shown in Figs. 6 and 7 comprises a glass plate 167 on the back surface of which is deposited a pair of interlocked or interleaved comb type opaque metallic grids, similar to the grids in the Fig. 4 cell heretofore described, with the grids having combs or fingers 172 and 174 of gold or silver or a similar conductive material. Between the interleaved fingers of the grids, and over the grids, is a translucent layer of photoconductive material 172 which may be cadmium sulphide or the like. On top of the photoconductive layer is a second pair of interlocked comb-type opaque metallic grids having combs or fingers 168 and 170 of gold or silver or the like. The glass plate, grids, and photoconductive layer are potted in a transparent dielectric plastic housing 175, the edges and part of the front and back of which are covered by an opaque covering 173, to provide transparent wall portions for the cell through which light may pass from the outside of the cell to impinge upon opposite surfaces of the photoconductive layer. As shown in Fig. 7, four side rails 174, 176, 178, and 180 extend along opposite edges of the grids and are connected to alternate fingers thereof. Four terminals or leads 182, 184, 186, and 188 may be provided, if desired, with one terminal connected to each side rail. Alternatively, two terminals may be provided, one connected to one grid and one connected to the other grid of one of the pairs of grids.

The cell of Figs. 6 and 7 is more sensitive to light than the cell of Figs. 4 and 5. This may be explained by the fact that each finger of the grids is a good conductor of electricity while the cadmium sulphide is a variable resistor or photoconductor having a high resistance in an absence of light. The metallic grids of the cell of Figs. 6 and 7 more finely define or break up the total surface area of the photoconductive layer than do the grids of the cell of Figs. 4 and 5, and the electrons attempting to flow through the cell of Figs. 6 and 7 have a greater number of paths that they may travel through the photoconductive layer. They may flow between interleaved fingers of the grids on one surface of the layer or they may flow through the layer to fingers of opposite polarity on the opposite surface of the layer. If the leads 182 and 184 are connected together, and the leads 186 and 188 are connected together, the grids on one surface of the photoconductor layer are then connected in electrical parallel relationship with the grids on the opposite surface of the layer.

The cells of Figs. 3 and 6 and 7 are dual-faced cells in that the modulating light signal enters through the back of the cell while the primary light enters through the front. In other words, when considering the cell of Fig. 6, the modulating light enters through transparent wall portion 190 while the primary light signal enters through the transparent wall portion 192. It should be understood that just the reverse of this may be possible in certain applications. The modulating light will act upon the area of the photoconductive layer as indicated by areas M in Fig. 6, reducing the resistance between the interleaved fingers 168 and 170 on the back surface of the layer. The primary light signal will act on the opposite surface of the photoconductive layer as indicated by the areas P to reduce the resistance between the interleaved fingers 172 and 174 on such surface of the layer. These two separate light signals, the primary light and the modulating light, react together to reduce the total resistance of the cell. Experimentation has proved that this cell is more sensitive to fluctuations of the primary light signal as well as the modulating light signal than the cell of Figs. 4 and 5.

It is apparent that the glass plate 144, photoconductive layer 146, and grids 148 and 150 of the Figs. 4 and 5 embodiment, could be potted in a plastic housing without the modulating lamp 156 after the fashion of the Figs. 6 and 7 cell, such that the modulating light would enter through the back wall of the plastic housing and the primary light would enter through the front wall of the plastic housing, all without departing from the spirit of the invention.

What I claim is:

1. In a system for automatically dimming multiple-filament head lamps: a source of unregulated power; a photoconductive cell connected to said source and having an output connection; switching means connected to the output connection of said cell for alternately energizing different filaments of the head lamps in response to varying current flow through said cell; a modulating lamp disposed to illuminate said cell; and automatic means connected to said source and to said modulating lamp to increase the difference in electrical potential across the modulating lamp to thereby increase the illumination of the modulating lamp in response to a decrease in the voltage at said source, and decrease the difference in electrical potential across the modulating lamp to decrease the illumination of the modulating lamp in response to an increase in the voltage at said source to maintain the output of the cell constant with varying voltages at said source.

2. In a system for automatically dimming multiple-filament head lamps: a source of unregulated power; a photoconductive cell connected to said source and having an output connection; switching means connected to the output connection of said cell and to said source for alternately energizing different filaments of the head lamps in response to varying current flow only through said cell; a modulating lamp disposed to illuminate said cell; and automatic means connected to said source and to said modulating lamp to increase the difference in electrical potential across the lamp and thereby increase the illumination of the modulating lamp in response to a decrease in the voltage at said source, and decrease the difference in electrical potential across the modulating lamp to thereby decrease the illumination of the modulating lamp in response to an increase in the voltage at said source to maintain the output of the cell constant with varying voltages at said source.

3. In a system for automatically dimming multiple-filament head lamps: a source of unregulated power; a photoconductive cell connected to said source and having an output connection; switching means for alternately energizing different filaments of the head lamps; electronic means connected to the output connection of said cell and to said source and to said switching means and responsive to a determined current flow through the cell to actuate said switching means by current from said source; a modulating lamp disposed to illuminate said cell; and automatic means connected to said source and to said modulating lamp to increase the illumination of the modulating lamp in response to a decrease in the voltage at said source, and decrease the illumination of the lamp in response to an increase in the voltage at said source to maintain the output of the cell constant with varying voltages at said source.

4. In a system for automatically dimming multiple-filament head lamps: a source of unregulated power; a photoconductive cell connected to said source; switching means for alternately energizing different filaments of the head lamps and including a relay; electronic means having a control terminal connected to said cell and having input and output terminals connected to said source and to the coil of said relay, and responsive to a determined current flow through the cell to permit sufficient current flow between said source and the coil of the relay to actuate the switching means; a modulating lamp disposed to illuminate said cell; and automatic means connected to said source and to said modulating lamp to increase the illumination of the modulating lamp in response to a decrease in the voltage at said source, and decrease the illumination of the lamp in response to an increase in the voltage at said source to maintain the output of the cell constant with varying voltages at said source.

References Cited in the file of this patent

UNITED STATES PATENTS

| | | |
|---|---|---|
| 1,966,219 | Rentschler | July 10, 1934 |
| 2,037,075 | Haines | Apr. 14, 1936 |
| 2,240,397 | Holleman | Apr. 29, 1941 |
| 2,558,969 | Le Croy | July 3, 1951 |
| 2,679,616 | Onksen | May 25, 1954 |